US005568963A

United States Patent [19]
Bennett et al.

[11] Patent Number: 5,568,963
[45] Date of Patent: Oct. 29, 1996

[54] METHOD AND APPARATUS FOR MULTIMEDIA PRESENTATIONS

[75] Inventors: Allen C. Bennett, Mission Viejo; Bruce E. Del Mar, Laguna Beach; Marna B. Schnabel, Los Angeles, all of Calif.

[73] Assignee: Del Mar Avionics, Irvine, Calif.

[21] Appl. No.: 208,535

[22] Filed: Mar. 9, 1994

[51] Int. Cl.$^6$ .................................................. G03B 21/54
[52] U.S. Cl. ............................ 353/122; 312/9.1; 312/10.1
[58] Field of Search ....................... 353/119, 72; 348/836, 348/838, 839, 843; 312/7.2, 9.1, 10.1, 9.41, 9.42, 9.55, 9.56, 9.64; 108/95, 96, 101, 106

[56] References Cited

U.S. PATENT DOCUMENTS

| | | | |
|---|---|---|---|
| 1,385,955 | 7/1921 | Serrurier | 312/10.1 |
| 4,541,343 | 9/1985 | Erard | 312/7.2 |
| 4,607,897 | 8/1986 | Schwartz | 312/7.2 |
| 5,160,104 | 11/1992 | Sher | 108/96 |
| 5,273,352 | 12/1993 | Saper | 312/7.2 |
| 5,278,596 | 1/1994 | Machtig | 353/122 |

FOREIGN PATENT DOCUMENTS 2678813  1/1993  France .................................. 312/7.2

*Primary Examiner*—William C. Dowling
*Attorney, Agent, or Firm*—W. D. English, Esq.; J. D. Leimbach, Esq.

[57] ABSTRACT

A mobile audio visual presentation system contained within a telescoping tower platform that provides height adjustment means for video display devices. The telescoping tower provides stability, transportability, versatility and optimum sound/video projection angles for multimedia audio visual presentations. The system remotely programs and controls a plurality of multimedia projection devices by interfacing ambulatory hand-held controllers, via radio frequency, to select and control multimedia elements within the system. The radio frequency signals containing desired commands are transmitted and automatically switched to multimedia devices sensitive to either infrared signals or X.10 power line carrier signal (PLC). The remote controls interface the multimedia devices in real time and provide the ability to access chosen segments of recorded video, sound and data, thereby, providing multiple operators with the freedom to interact with an audience during a multimedia presentation and vary time and sequence of events without encountering signal dropout.

17 Claims, 6 Drawing Sheets

METHOD AND APPARATUS FOR MULTIMEDIA PRESENTATIONS

BACKGROUND OF THE INVENTION

1. Field of the Invention

The invention relates to audio/visual presentations, and more specifically, to effective multimedia presentations employing telescoping apparatus with combinations of multimedia devices and roving control, thereof.

2. Description of the Prior Art

Numerous educational audiovisual projection devices exist that present information from the various media such as photo film slides, overhead light page projection, video cassette sound motion picture films, laser disc video projection or laser compact disc projection. These devices play increasing roles in providing audiences with the audiovisual multimedia information that is valuable to educational institutions. Areas such as teaching, publicizing and expanding the interest of viewers increasingly require multimedia presentations throughout the educational industry. Many other institutions and industries require multimedia presentations for education of there employees, as well as advertising and group presentations in general.

Audio/visual projection systems currently available provide the ability to create multimedia presentations that can be remotely controlled. There are currently existing systems that allow operators the freedom to move about while remotely controlling presentations. While, these systems are significant in providing freedom of movement for the operator, they are constructed using separate electronics to interface the multimedia devices to a remote control to enable the freedom of movement during a presentation. A presentation system does not exist that, economically, combines the functions of these various multimedia devices into one remotely controlled integrated audio-visual system that allows the person, or persons, making the presentation to move about the room freely while remotely controlling the presentation.

Currently available presentation systems may employ carts with shelves to hold the various multimedia devices. These systems do not provide means for holding multimedia devices in an easily transported design combined with a design that can be used as a versatile display system. Furthermore, currently available systems do not have the ability to adjust the height of sound and light projection devices for controlling the elevation of multimedia devices during audio-visual presentations, to achieve direct projection angles and to avoid interfering with the direct view of audiences seated to the rear of the projection equipment. Moreover, systems do not exist which are suitable for realtime interactive presentation to audiences, that can be controlled and operated by more than one presenter, or that are equipped to be mobile within the viewing area of the audience.

Equipment termed as Video Equipment Lift Consoles exist within the prior art that contain spring loaded platforms capable of lifting the platform out of a shipping enclosure. Some devices also provide compartments where multimedia components can be stored or used. However, these devices do not provide for motorized adjustment of multimedia devices loaded on platforms or elevation variability of display devices and, therefore, are limited. Furthermore, these designs do not provide the flexibility for interactive audience participation in the presentation and have no provisions for security from theft or adequate provision for roving system operation by wireless control.

As can be seen from the foregoing discussion, there is a need within the art for a method and apparatus that can produce multimedia presentations, in an integrated and effective manner that allows users to retain freedom of movement combined with a system that is easily transportable and versatile in making presentations. These and other problems are solved by the disclosure of the present invention.

SUMMARY OF THE INVENTION

A multimedia presentation system as disclosed herein by the detailed description presents a novel system that can be economically constructed wherein numerous multimedia devices are controlled remotely by a user. The user is given the ability to control any, or all, of the devices, without the constraints that exist within the prior art. Flexibility of presentation is enhanced by multiple presenters being able to move freely about the presentation room while retaining the same degree of control over the multimedia devices as if manual control over each individual device control panel was being employed.

The system employs remote control means that provide for digital control over all the multimedia devices in the system. A remote control emits radio frequency (RF) signals in response to commands entered by the user. These RF signals are transmitted into the air medium where they are received by an RF receiver in a telescoping tower containing various multimedia devices. The RF receiver converts the RF signal into either an infrared (IR) signal which is the standard mode of remote control for the various multimedia devices or an X.10 defacto standard power line carrier (PLC) signal. The converted signals are emitted to all remotely controlled devices through IR extenders, or X.10 defacto transmission control. These signals are capable of controlling the various pieces of equipment within the multimedia system. Additionally, the individual pieces of equipment can have their power controlled via digital signals on their AC power line. The IR extenders are situated to emit an IR signal to the various multimedia devices and can be daisy-chained to increase or decrease the number of IR extenders as needed. Interfacing the remote control with the multimedia devices in this manner, provides the operator with freedom during a multimedia presentation without worrying about which direction the remote control is pointed.

The system employs a telescoping tower attached to a mobile cabinet to house a plurality of multimedia devices. A variable height platform is telescopically mounted above the mobile cabinet via elevation means. The elevation means are designed to move the upper platform down for transportation and storage and upward to project audio and visual information to a projection screen without interfering with the audiences' view from a seated position behind the projection system. A powered telescoping mechanism is used in the preferred embodiment to elevate the multimedia display devices.

Projection of sound, photography and video from recordings in black and white, color, and either in motion or still form, are provided by an array of projection equipment mounted on and within the elevation-equipped mobile cabinet of the system. The preferred system provides two commercial 35 mm slide projectors, a stereo speaker system, a VCR recorder-player, an audio cassette recorder-player, a video disc player, a compact disc player and an opaque overhead light projector together with the necessary recorded tapes, films, 3 dimensional objects and documents to be heard and/or shown. The compact disc (CD) player may be equipped with CD ROM, CD Audio or PHOTO CD. Also, a computer can be interfaced with the video to produce computer images. In the system there are two special hand-held radio transmitters, either one or both of which can be used for pushbutton control of the multimedia presentation components from any roving position within or adjacent to the audience. The presenters are each equipped with a wireless hand held or clip-on microphone for live oral presentation to an audience.

It is the object of the invention to create a system for multimedia presentations in which display devices can easily have their height adjusted.

Another object of the invention is to create a multimedia presentation system in which the operator can freely move during the course of the presentation without concern as to position or directional orientation of the wireless remote control.

Another object of the invention is to teach a multimedia system in which a sufficiently large number of multimedia devices are incorporated to make the system useful for a wide range of multimedia presentations with optional sequencing by the presenter to enliven audience reaction.

Another object is to create a system having numerous multimedia devices set in a highly adjustable platform that is power driven to downsize for its transportation within the confines of a hotel, convention center, school or business.

Still another object of the invention is to disclose a method of making effective multimedia presentation with hand held remote control to permit unrehearsed audience participation and recall on an interactive basis with the lecture presenter.

Still another object of the invention is to provide a presentation system which equips a lecturer with means to provide stereo sound and interfaces the lecturer with an array of photo projection, taped sound, music or speech, VCR photo slides, color pages, typed text in three-dimensional images, compact disc sound, music or speech, laser disc sound, music, color pictures and fast motion color video.

Still another object of the invention is to provide a control system in a multimedia presentation system which provides for presentation of previously selected portions of VCR tapes, laser discs, compact discs and sound tapes by setting predetermined bits within a computer control word such that the system can call for and detect the bit code resulting in a rapid sequencing of selected media portions to effectively maintain audience interest by the preplanned progression of illustration, motion and sound contained within the audio-visual presentation.

DESCRIPTION OF THE PREFERRED EMBODIMENT

A multimedia presentation system has been discovered in which a single remote control can provide exacting control over numerous multimedia devices without restraining the movement of the operator. The disclosed system is inexpensive due to the specific elements used in combination to implement the desired functions. The multimedia devices are contained in a tower cabinet having racks for locating multiple multimedia devices. The tower cabinet has an elevating display portion that can safely and easily be adjusted to an infinite number of heights under motorized control.

Figure 1A:
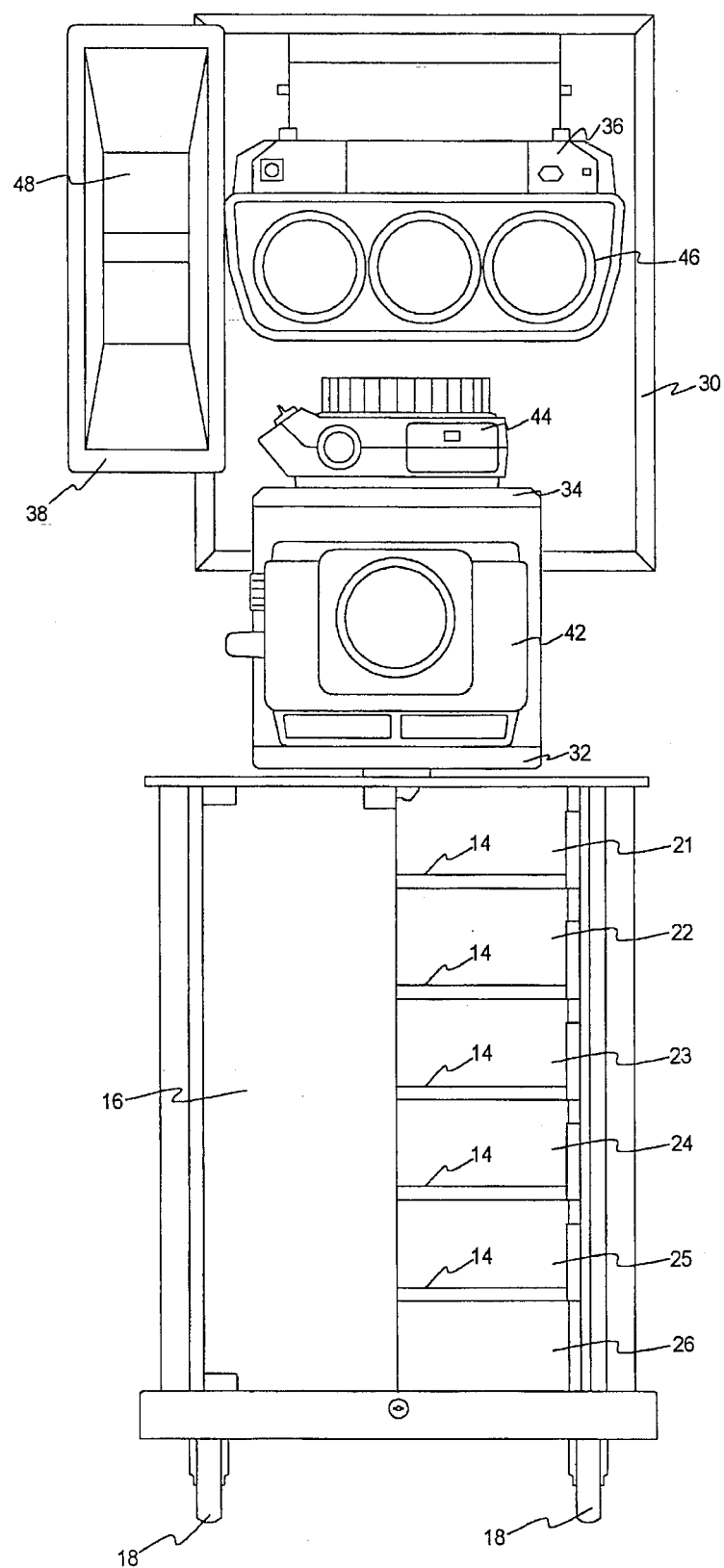
FIG. 1a is a front view of the disclosed device.
Figure 1B:
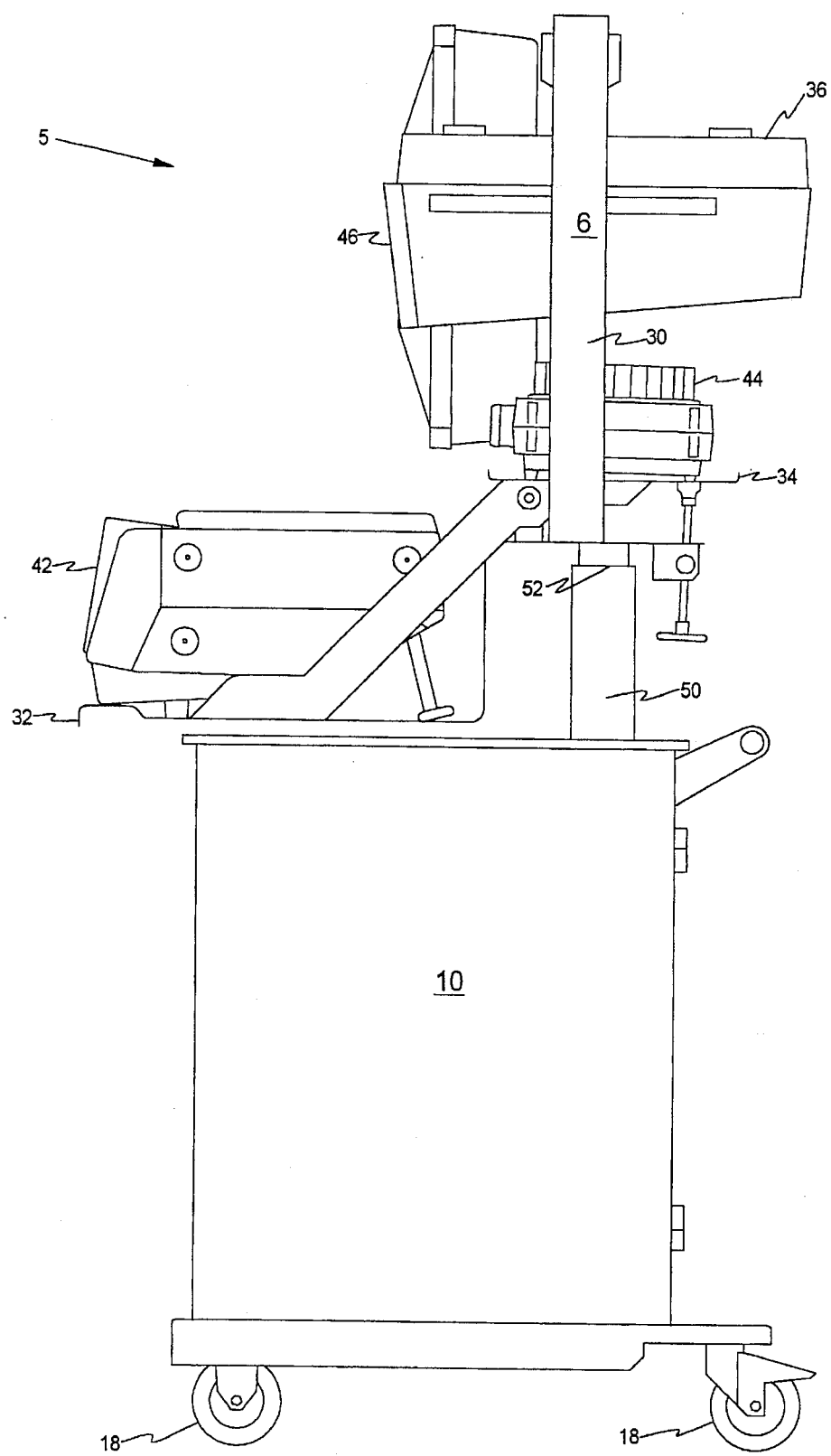
FIG. 1b is a side view of the disclosed device.

Referring now to FIG. 1a and FIG. 1b, a multimedia presentation system, generally referred to as 5, is seen as conceived by the present invention. The system 5, employs an audio/visual presentation tower 6 having a cabinet rack 10 and an elevated rack 30. Cabinet rack 10 is utilized for housing storing multimedia devices mounted therein. Cabinet rack 10 has a plurality of shelves or bays 14, and a pair of doors 16 mounted to the front thereof. Cabinet rack 10 also has a plurality of wheels 18 attached to the bottom thereof to create a presentation system that can be transported with ease. Cabinet rack 10 is used to house at least one multimedia device. It is envisioned that numerous multimedia devices will be mounted in cabinet rack 10.

While numerous configurations are envisioned to practice the present invention the preferred embodiment employs six multimedia devices mounted within cabinet rack 10. These are: a wireless microphone 21, a laser disc and/or compact disc (CD) player 22, audio cassette player 23, a video cassette recorder (VCR) 24, a graphic equalizer 25 and a mixer amplifier 26. The devices mounted in cabinet rack 10, with the exception of wireless microphone 21, may be referred to as multimedia storage retrieval devices. These devices are responsible for playing prerecorded data, either audio or visual or both, in a format that can interface with a conventional display device as discussed below.

The multimedia devices contained in cabinet rack 10 interface with a complementary set of display devices provided in elevated multimedia rack 30. Elevated rack 30 provides a plurality of shelves uniquely designed to accommodate various multimedia display devices. In the preferred embodiment, a front shelf 32 holds an opaque projector 42; a slide projector 44 is contained by a middle shelf 34; a top shelf 36 is used to hold a Liquid Crystal Display (LCD) 46; and a speaker 48 is contained above on a speaker shelf 38. Each of these shelves has a specific purpose within the preferred embodiment of the invention. However, it is envisioned that various alterations to this preferred embodiment will be equally useful, as the overall purpose of the present invention is to provide a multimedia system in which virtually any type of multimedia device can be accommodated.

Elevated rack 30 is designed to attach to cabinet rack 10 via an elevation shaft 50 connecting the two racks. The elevation shaft 50 is specifically designed to move elevated rack 30 downward for transportation and storage and upward to project audio and video information to a projection screen. The view of an audience from a seated position is not obstructed when the system has elevation shaft 50 in the raised position. This is especially useful when members of the audience are seated behind the projection system. A powered telescoping mechanism 52 is used in the preferred embodiment as the elevation shaft 50. Elevation shaft 50 is specially designed for controlling the height to which elevated multimedia rack 30 can be adjusted. The preferred embodiment of the invention employs a telescoping mechanism 52 to raise and lower elevated rack 30 to an infinite number of positions within the range of telescoping mechanism 52. An electric motor 54 (not shown) is used to control the movement of telescoping mechanism 52 in raising and lowering elevated rack 30. Telescoping mechanism 52 employs a worm drive system that operates under control of electric motor 54 to raise and lower elevated rack 30. Electric motor 54 is a linear actuator motor which provides an analog motion to telescoping mechanism 52 at a constant speed in a straight line path. The analog control of electric motor 54 upon telescoping mechanism 52 yields an infinite number of positions to which the height of elevated rack 30 can be adjusted. Telescoping mechanism 52 vastly improves upon the prior art devices which have means for adjusting the height of multimedia display devices. A switch 56 (not shown) in the rear of the multimedia presentation system 5 provides control over the continuous movement of telescoping mechanism 52.

Figure 2:
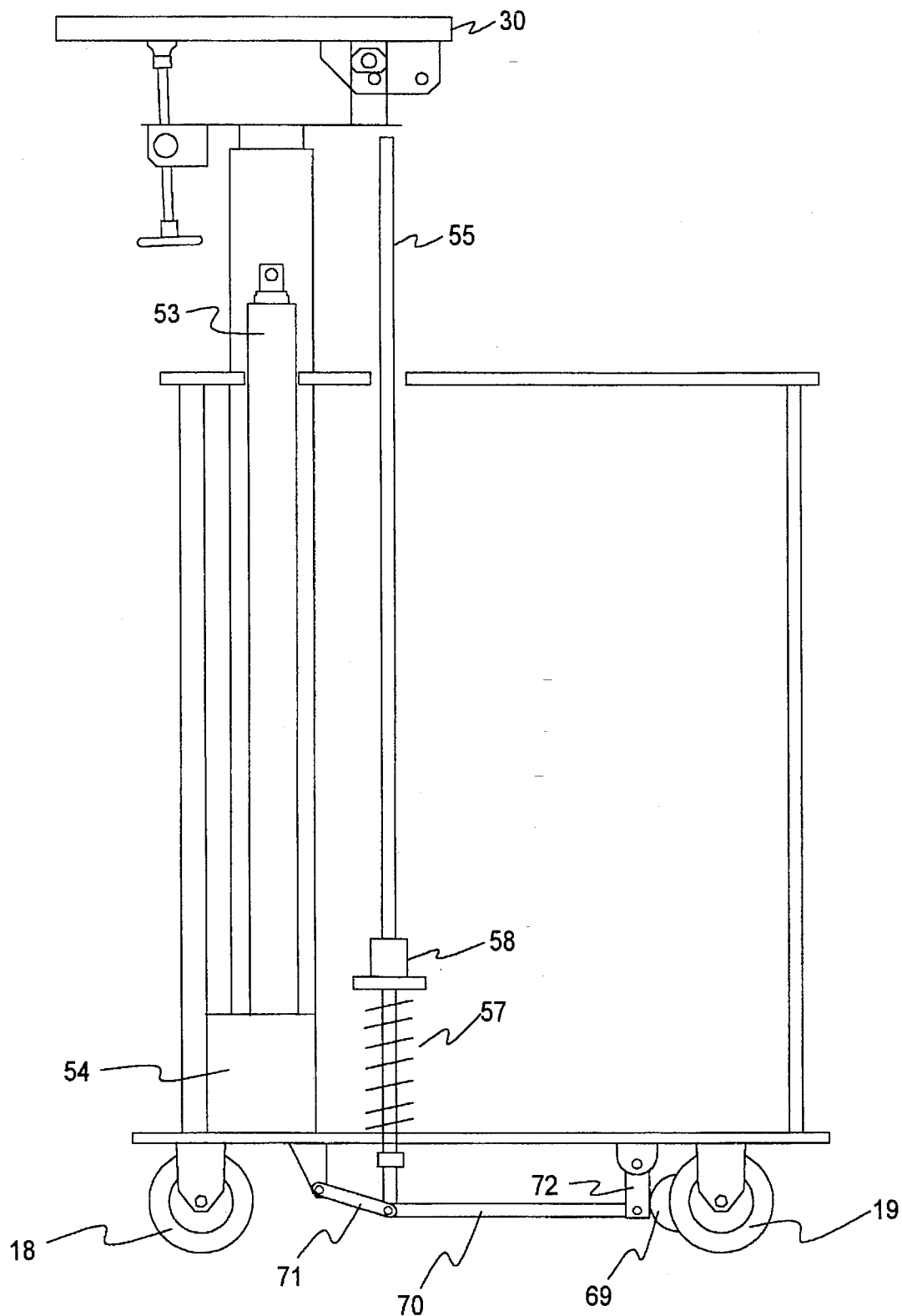
FIG. 2 is a diagram of a braking system envisioned for use with the present invention

Referring now to FIG. 2, a diagram is illustrated of a braking system envisioned to be used with the present invention to prevent movement of the system while elevated rack 30 is in a raised position. The design of the overall tower has elements to avoid accidental tipping. Numerous variations of these designs are possible. Only the most preferred embodiments will be discussed, herein. The basic design of the tower 6 uses a wheel base that is both long and wide to enhance stability and prevent tipping. To further prevent tower 6 from tipping, a brake system can be employed as shown in FIG. 2. Here, a brake shoe 69 is placed against a non-swivel wheel 19 and held in place a brake rod 70, a hinged rod 71, and a hinged element 72. The movement of elevated rack 30 downward by a worm drive comprising a threaded member 53 and motor 54 will engage the bottom of elevated rack 30 against the top of a rod 55. Once elevated rack 30 is completely in a lowered position, rod 55 will force brake rod 70 to release brake shoe 69 from wheel 19. Once elevated rack 30 is raised again, a spring 57 exerts an upward force upon a spring plate 58 which translates to an upward movement in rod 55. Brake rod 70 will then force brake shoe 69 against wheel 19 as a result of the upward movement of rod 55. This brake system provides a safety mechanism by which the system can not be moved with elevated rack 30 in a raised position. This configuration prevents movement of the system with elevated rack 30 raised and, thereby, restrains the system from being moved while it is top heavy.

The system envisioned by the present invention employs a unique combination of elements that economically provides the person responsible for making an audio-visual presentation the ability to move freely about the presentation area while still retaining an exacting degree of control over all the multimedia components within the system. It should be understood that the various multimedia devices intended to be used in the system are typically provided with means for infrared (RF) remote control by their respective manufacturer. Whereas, prior art devices do exist that employ radio frequency (RF) communication with multimedia elements, these prior art devices employ an electronic rack having individual ports that interface with the various multimedia devices. These ports, in turn, each require electronic modules inside the electronic rack to perform the radio frequency interface with the multimedia devices, which make the radio frequency remote control a prohibitively expensive feature.

Figure 3:
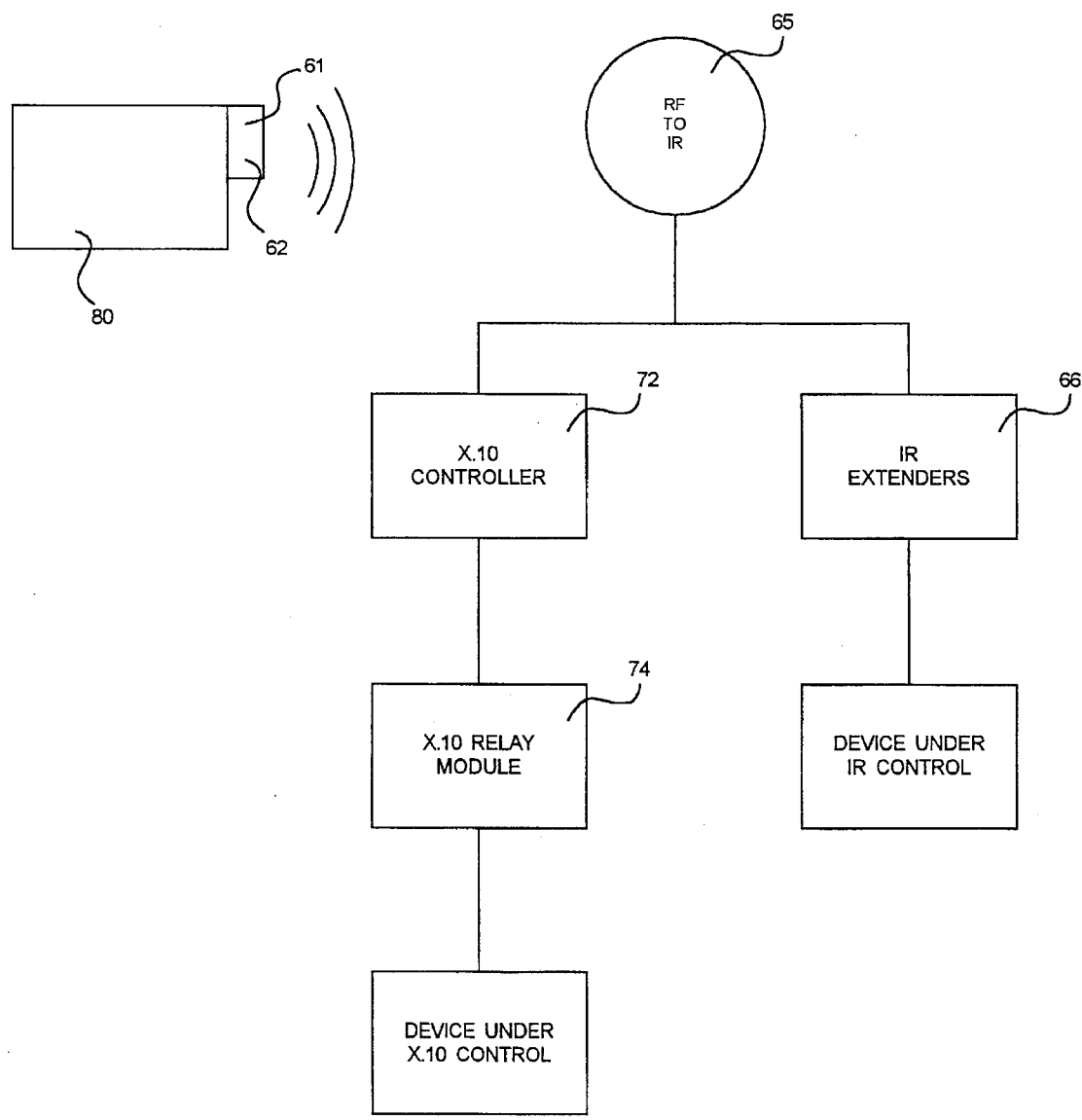
FIG. 3 is a block diagram of the audio/visual display system.

Referring now to FIG. 3, a block diagram of the electronics and communications of the audio/visual display system is seen as envisioned. The system employs a transmitter/adaptor which functions both as an RF adaptor 61 and as an RF transmitter 62. However, it should be understood that numerous generic transmitter/receivers can be used in combination with the remaining elements of the present invention to perform the same overall function. A required element of the present invention is that radio frequency communication be established. The radio frequency signals are omnidirectional. The powerful omni-directional RF signals are transmitted into the air medium where they are received by the multimedia components on the tower 6. This allows a person using the system for audio visual type multimedia presentations to move freely while giving the presentation and is, therefore, preferred over the, more conventional, direct infrared communication systems.

On the tower 6, an RF receiver 65 receives the radio frequency waves transmitted by the remote control 80 and generates a series of electrical digital pulses in an IR format from these radio frequency waves. The electrical signals in IR format are representative of the original signal created within the remote control 80 and are a reconstruction of the original IR signals. Receiver 65 is also known within the art as an infrared repeater. The reconstructed signal generated by receiver 65 is a digital signal containing the exact digital information originally generated by remote 80. The reconstructed IR signals are then electrically extended to the multimedia components via infrared external emitters 66 which are light emitting diode (LED) based extenders that emit corresponding IR signals to the multimedia devices. The multimedia device receives the IR signal as if an infrared remote control was pointed directly at the multimedia device. In this manner control over the various functions of the multimedia devices is not lost.

Even fine details will be exactly reconstructed. As an example of the versatility achieved by the system of the present invention, sequence numbers representing a particular segment of a laser disc 22 can be entered into remote control 80. The remote control 80 will generate digital IR signals which are transmitted upon an analog radio frequency wave to instruct the laser disc to play a particular segment of the disc. The digital IR signal representing the segment of sequenced numbers is converted into a series of digital signals that are transmitted via radio frequency signal waves by radio frequency adaptor 61. The converted signals are then transmitted as radio waves by radio frequency transmitter 62. This technique for transmitting digital signals via an analog wave is a conventional technique. The radio waves are received by radio frequency receiver 65 and converted back to the original digital infrared control signals that contain the segment of sequenced numbers representing a particular segment of the laser disc that is to be played. The reconverted signal is then electrically extended to laser disc 22 by IR extenders 66 where the IR instruction tell laser disc 22 to play that particular segment.

Additionally, the RF receiver 65 emits an IR signal to a power line carrier unit (PLC) 72 which receives and interprets the IR signal. In the preferred embodiment, PLC unit 72 is used to provide for a unified activation and deactivation of power to the various multimedia components. The PLC unit 72 sends an X-10 code format signal on an AC power line in response to operator entered command on the unified remote control 80. Relays 74 are situated such that there is one relay 74 for a particular multimedia device. Relays 74 receive the digital signal contained on the AC power line and either activate or deactivate power accordingly.

Transmission of signals in this manner allows an operator of a multimedia presentation to face in any direction while speaking and making a presentation, without being concerned about his distance from the multimedia devices or the exact direction in which the remote control is pointing.

The preferred embodiment of the invention employs the X.10 Defacto standard for controlling appliances. One of the major purposes of using the X.10 defacto standard is to insure the simultaneous actuation of power to each of the multimedia devices. By pressing the power button on the unified remote control device 80, a digital IR signal is transmitted which is converted to an equivalent RF signal by adaptor/transmitter 62 and transmitted as a series of radio frequency waves to the multimedia presentation system. The radio frequency waves are then received by RF receiver 65 on the multimedia presentation system and reconverted back into an its original digital IR signal that is transmitted to an X.10 defacto standard control module 72. The X.10 defacto standard control module 72 receives the IR from RF receiver 65 and encodes a digital signal on its own AC power line. The digital signal is received by relays 74, which in the preferred embodiment are remote controlled AC line relays.

The relays have switch encoders that enable them to be individually selected. Additionally, all the relays may be simultaneously selected. The simultaneous activation of power to the multimedia devices within the preferred embodiment is accomplished by a single keystroke of unified remote control 80. The deactivation of power is again controlled by a single keystroke of unified remote control 80 which performs the steps of ensuring that the relays 74 are on and powering down the individual multimedia devices.

The systems RF control of the multimedia devices is a greatly desired improvement over IR remote control because it ensures that all the multimedia devices receive the signals intended to be sent. Using simple IR communication for remote control, one multimedia device could receive a signal and another may not due to the orientation of the remote control device with respect to the various multimedia devices. The addition of radio control yields a simultaneous control that is not ensured by simple IR control. The use of RF receiver convertor 65 in conjunction with the combination of IR extenders 66 and the X.10 defacto standard yields a system in which effective multimedia presentations can comfortably be accomplished. Remote control 80 can be programmed to address numerous multimedia devices. The combination of IR extenders with the X.10 defacto system yields a system in which all the features of the multimedia devices can be controlled in a system that is simpler to activate and costs significantly less than prior art systems.

To provide selective play of chosen parts of VCR tapes, laser discs, compact discs, sound tapes and 35 mm slides, the presentation system provides direct entry in one of three methods. The first method is to have the presenter bring to the system for presentation either queued tapes or tapes run to entry points for run and stop on command. The second method applies to the 35 mm photo slides and is operatively active since the operator is given means for slide-by-slide call-up, as previously sequenced in place on the slide carousel, or by random access call up. The third method of spot call-up is provided by bar code indexing at chosen bar code locations on laser discs, VCR's using society of motion picture and television engineers (SMPTE) time codes, slide projectors that have random access capabilities or compact discs. This bar code access consists of a wireless laser disc bar code controller outfitted with an IR to RF convertor as shown in FIG. 3. The hand held command control 80 features bar code controls that provide for the reading and sending, in digital format, of numbers which represent entry positions in the track of a laser disc or of a VCR using SMPTE times codes or of a compact disc. Activation of that input signal index is transmitted by the RF transmitter 65 to the selected device under X.10 control when the start and stop is then automatically activated.

Figures 4A, 4B, 4C:
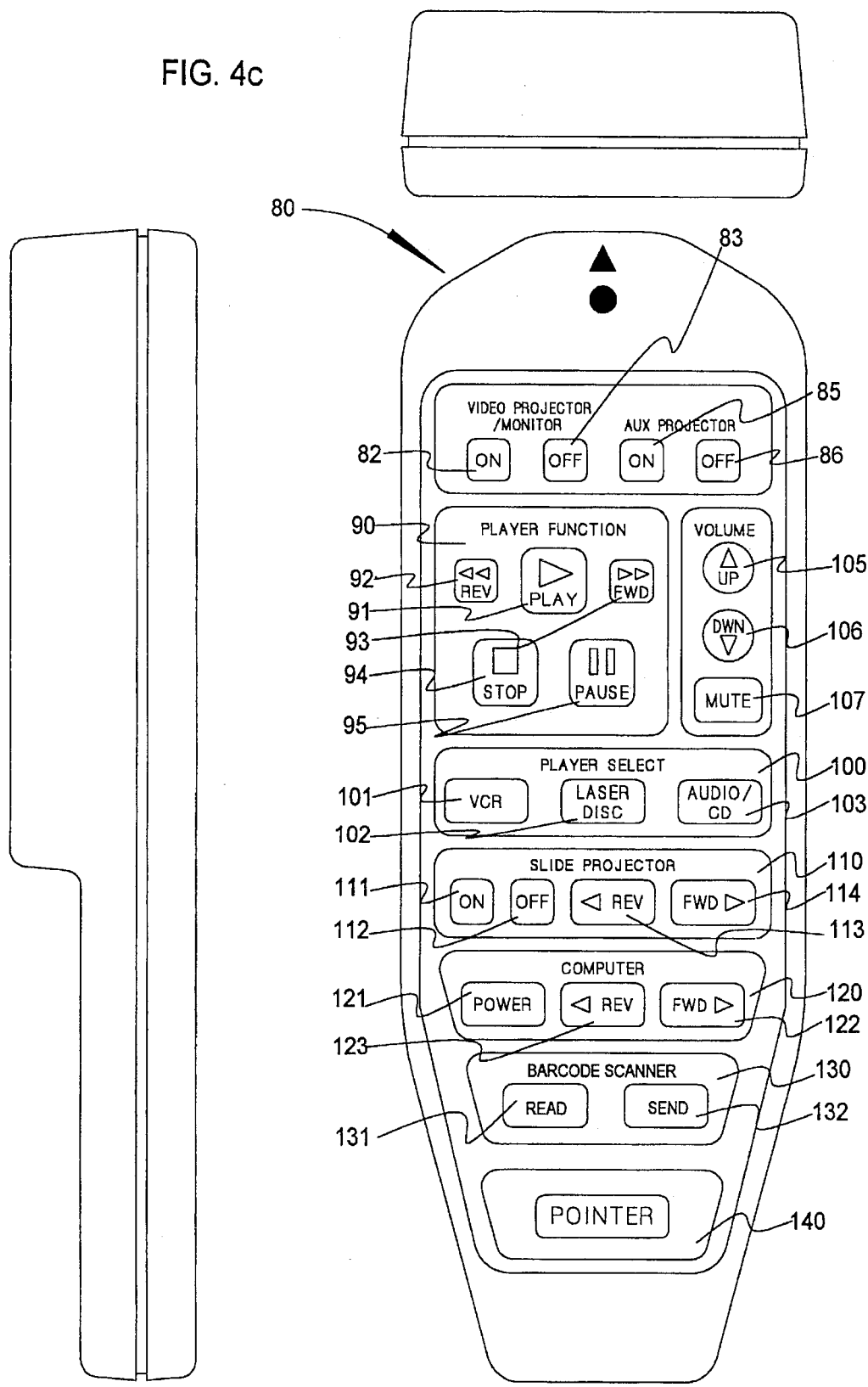
FIG. 4 is an external diagram of the remote control envisioned within the present invention.

Referring to FIG. 4 an external diagram is provided of the remote control 80 envisioned by the present invention. Shortcomings of the prior art are addressed by employing remote control 80 to provide the precise control over the multimedia system elements required by the disclosed system. The requirements for remote control 80 necessitate that the user be allowed to move freely while controlling the multimedia devices during a presentation. In order to accomplish this task the remote control uses radio frequency communication with the multimedia devices. The usage of radio frequency signals provides the operator with the desired mobility and remains a cost effective technique for implementing a remote control.

Remote control 80, as envisioned by the present invention, provides a radio frequency interface with the audio/visual tower 6 as well as controls to operate the functions provided by remote control 80. Controls for actuating power for the selected video projector/monitor are provided via on 82 and off 83. The projector monitor is typically the LCD display 46 discussed above or a large television monitor. Additionally, power for an auxiliary projector is provided in on button 85 and off button 86. An auxiliary projector would be typically either the opaque projector or a transparency projector. Player function is controlled in section 90 with control functions for play 91, fast reverse 92, fast forward 93, stop 94 and pause 95. Volume controls are provided for increasing volume via up 105, decreasing volume via down 106 and mute 107 controls. A player select 100 section provides for selecting of either VCR 101, laser disc 102 or AUDIO/CD. A slide projector section 110 provides on 111, off 112 reverse 113 and forward 114 controls. Computer section 120 controls an interface between a personal computer and the audio visual tower and provides the control functions for power 121, forward 122, and reverse 121. Bar code Scanner section 130 has controls for read 131 and send 132. Pointer 140 provides for control of an on screen laser pointer.

Figure 5:
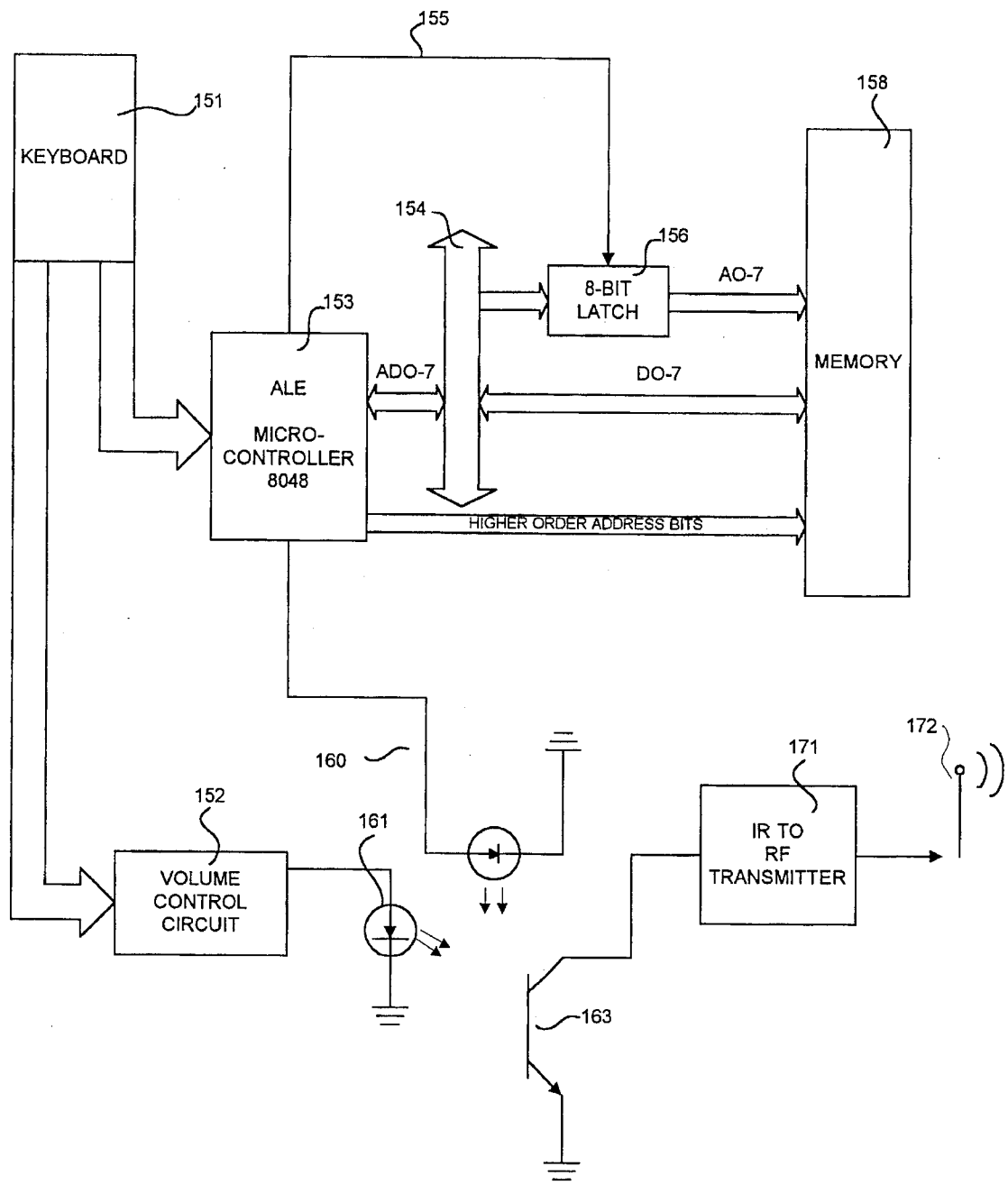
FIG. 5 is a functional block diagram of the remote control illustrated in FIG. 4.

Referring now to FIG. 5, a functional block diagram of the remote control 80 is diagramed and illustrates the combination of elements that allows the present invention to provide a radio frequency interfacing between the various multimedia devices of the system and a remote control while still retaining a great deal of mobility and flexibility on the part of the user. This is accomplished by employing a remote control having activation features typical to prior art devices but modified to accommodate a multipurpose radio frequency transmitter. Typically, conventional remote controls emit infrared light to control devices capable of being remotely controlled. The present invention employs remote control 80 which is modified by the inclusion of a radio frequency (RF) adaptor to convert the commands generated by the unified remote control into a radio frequency form which is omnidirectional and has longer range than infrared signals typically used for remote controls. Commands are entered into remote control 80 via a keyboard 151. The present invention employs an 8 bit microprocessor 153 to act on the entered commands. The preferred processor 153 is selected from the 8048 microcontroller group and, accordingly, has the lower address bits multiplexed with the 8 bit data path. This configuration provides the necessary processing power in combination with the affordable cost of using a relatively small data bus. Most commands will be broken into segments used to find information in a look up table contained in memory 158 by having an address latch enable (ALE) latch the initial address bits contained on the 8 multiplexed lines 154 into an 8-bit latch 156 when addresses are valid. The outputs of latch 156 are directly electrically connected to the 8 lower address lines of memory 158. All address lines higher in order than the lower 8 bits are directly connected to their respective address lines of memory 158. The lower multiplexed address lines are also directly connected to the 8-bit data path of memory 158. Codes for the remote operation of various multimedia devices are contained within memory 158 and fetched from there by processor 153 to be output to an optoisolator circuit where LED 160 causes a phototransistor 163 to output data. The term optoisolator circuit as used, herein, is intended to identify the relation of light as the only coupling means between LED 160 and phototransistor 163. Thereby, physically isolating the two circuits in the absence of light.

The mechanism by which volume controls are implemented is similar to other command controls. However, a look up table is not used. Instead, commands related to volume control are input into volume control circuit 152 from the keypad 151 prior to being output to LED 161. As with the previously discussed optoisolator circuit, the output of LED 161 is used to drive phototransistor 163.

The outputs from the two LEDs 160, 161 are used as inputs to phototransistor 163 which performs the final encoding of data for radio frequency transmitter 171. The converted RF signals are then transmitted to the multimedia devices carrying the original commands on a radio frequency.

While the detailed description of the present invention has disclosed the best modes presently known to the inventor, it should be understood that various modifications will be obvious to persons skilled in the relevant arts, and that these obvious modifications are still within the spirit and scope of the invention as defined by the appended claims.

What is claimed is:

1. A portable, expandable, and remotely controlled audiovisual tower for multimedia presentations, comprising;
    a cabinet rack, having mobile means and containing a plurality of shelves capable of holding at least one multimedia data recording and storage device;
    an elevated rack containing a plurality of shelves capable of holding at least one multimedia display device;
    telescoping means for connecting, expanding, and elevating said elevated rack to and from said cabinet rack;
    radio frequency and infrared control means for remotely and operatively acting upon said multimedia devices.

2. The audio visual tower of claim 1, further possessing both manual and remote controlled height adjustment means for controlling elevation level of said elevated rack relative to said cabinet rack.

3. The audio visual tower of claim 2, wherein said remote controlled height adjustment means further consists of a vertical worm screw motorized means for elevating said elevated elevated rack and controlling movement of said telescoping means.

4. The audio visual tower of claim 1, further comprising:
    a plurality of multimedia data storage and retrieval devices disposed in said cabinet rack; and
    a plurality of multimedia display devices disposed in said elevated rack, each said multimedia display device being optically and electrically connected to its respective multimedia data storage and retrieval device can be displayed on said multimedia display device.

5. The audiovisual tower according to claim 4 wherein said multimedia devices are controlled by at least one hand held remote control device.

6. The audiovisual tower according to claim 5 wherein said remote control interfaces with said multimedia presentation devices via a radio frequency interface sending digital signals on radio waves to said tower where said RF signals are converted by an RF interface to infra red signals to directly control said multimedia devices.

7. The audiovisual tower according to claim 6 wherein said radio frequency interface further comprises:
    at least one radio frequency receiver disposed on said tower;
    at least one infrared repeater electrically connected to said radio frequency receiver and optically connected to at least one of said multimedia devices; and
    at least one X.10 defacto standard signal transmitter electrically connected to said radio frequency receiver and electrically connected to at least one of said multimedia devices.

8. The portable audiovisual tower according to claim 6 wherein said remote control means further comprises a conventional infrared remote control device modified by an infrared to radio frequency convertor capable of converting operator entered commands into a radio frequency equivalent of those commands.

9. The portable audiovisual tower according to claim 1 wherein said mobile means consists of a set of casters with automatic braking means to enable self supported mobility and a fixed position support of said tower.

10. The portable audiovisual tower according to claim 4 wherein said remote control further comprises selection means for selecting predetermined segments of said multimedia storage devices.

11. The portable audiovisual tower according to claim 1 further comprising a brake that engages when said elevated rack is not in a lowered position.

12. A method of presenting audio visual displays comprising the steps of:
    manufacturing a platform capable of containing at least one display device and at least one storage device;
    placing within said platform communication means for receiving radio frequency signals and delivering a version of these signals to said devices; and
    providing remote control means capable of transmitting radio frequency signals to said platform.

13. The method of claim 12 wherein said step of placing communication means further comprises:
    employing a radio frequency receiver;
    placing at least one radio frequency to infrared convertor within said platform, said radio frequency to infrared convertor being electrically connected to said receiver; and
    electrically extending signals converted by said radio frequency to infrared convertor to at least one of said devices.

14. The method of claim 13 wherein said step of providing remote control means further comprises:
    electrically attaching an infrared to X.10 defacto standard convertor to said radio frequency to infrared convertor; and
    transmitting X.10 defacto signals to at least one of said devices.

15. The method of claim 14 wherein the step of providing remote means further comprises the step of controlling power via said remote means in order to simultaneously actuate power of all of said devices.

16. The method of claim 15 wherein the step of controlling power further comprises controlling power to said multimedia devices by operatively coupling at least one relay to at least one of multimedia devices, said relay being capable of being controlled via radio frequency signals.

17. The method of claim 16 wherein the step of controlling power further comprises:

selecting which multimedia devices shall be operatively coupled to said remote control means to have their power controlled by an X.10 defacto standard and which multimedia devices shall be operatively coupled to said remote control means to have their power controlled by infrared;

receiving a set of radio frequency signals and converting radio frequency signals received into either a set of X.10 defacto standard signals or a set of infrared signals for further transmission to said multimedia devices; and transmitting said infrared signals and said X.10 defacto signals to multimedia devices as selected.

* * * * *